United States Patent
Rohrig et al.

(10) Patent No.: US 11,946,798 B2
(45) Date of Patent: Apr. 2, 2024

(54) VIBRATION-BASED DIRECTIONAL SYNTHETIC AMBIENT SOUND PRODUCTION IN SPACE

(71) Applicant: Hamilton Sundstrand Corporation, Charlotte, NC (US)

(72) Inventors: Jake Rohrig, Simsbury, CT (US); Christopher A. Keith, Wilsonville, OR (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 359 days.

(21) Appl. No.: 17/220,022

(22) Filed: Apr. 1, 2021

(65) Prior Publication Data
US 2022/0316941 A1    Oct. 6, 2022

(51) Int. Cl.
*G01H 9/00*    (2006.01)
*A41D 1/00*    (2018.01)
*B64G 6/00*    (2006.01)

(52) U.S. Cl.
CPC ............. *G01H 9/00* (2013.01); *A41D 1/002* (2013.01); *B64G 6/00* (2013.01)

(58) Field of Classification Search
CPC ............. G01H 9/00; B64G 6/00; A41D 1/002
USPC ........................................................ 367/140
See application file for complete search history.

(56) References Cited

U.S. PATENT DOCUMENTS

| 10,078,328 | B1 | 9/2018 | Slater |
| 10,506,838 | B2 | 12/2019 | Tammam et al. |
| 2005/0201576 | A1 | 9/2005 | Barker et al. |
| 2010/0280826 | A1 | 11/2010 | Bakish |

OTHER PUBLICATIONS

Extended European Search Report for EP Application No. 22161137.9, dated Aug. 23, 2022, pp. 1-8.
Davis et al., "The visual microphone: passive recovery of sound from video", ACM Trans. Graph., 2014, pp. 1-10.

*Primary Examiner* — Daniel L Murphy
(74) *Attorney, Agent, or Firm* — CANTOR COLBURN LLP

(57) ABSTRACT

A system includes a vibration detector to detect a location of vibration and identify a frequency of the vibration. The system also includes a controller to generate audio corresponding to the frequency of vibration detected by the vibration detector and one or more speakers configured to provide the audio as directional sound.

14 Claims, 2 Drawing Sheets

VIBRATION-BASED DIRECTIONAL SYNTHETIC AMBIENT SOUND PRODUCTION IN SPACE

BACKGROUND

Exemplary embodiments pertain to the art of audio generation and, in particular, to vibration-based directional synthetic ambient sound production in space.

Ambient sound refers to the sound present in a scene or location. In nature, for example, the sounds of birds, leaves rustling, or a waterfall represent ambient sounds. In a city, traffic noises represent ambient sound. Humans detect ambient sounds through vibrations in the air. For example, wind causes vibration (i.e., rustling) of leaves, and the vibration is perceived as ambient sound. In space or on the surface of the moon, for example, there is no medium to transmit sound (i.e., sound waves cannot travel in space or on the surface of the moon). Thus, astronauts do not receive audible signals from the surroundings in the form of ambient sound.

BRIEF DESCRIPTION

In one embodiment, a system includes a vibration detector to detect a location of vibration and identify a frequency of the vibration. The system also includes a controller to generate audio corresponding to the frequency of vibration detected by the vibration detector, and one or more speakers configured to provide the audio as directional sound.

Additionally or alternatively, in this or other embodiments, the system is on or within an atmospheric suit that is configured for a space environment.

Additionally or alternatively, in this or other embodiments, the one or more speakers are within a helmet of the atmospheric suit.

Additionally or alternatively, in this or other embodiments, the one or more speakers is an array of four or more speakers arranged around a volume within the helmet.

Additionally or alternatively, in this or other embodiments, the array of four or more speakers and the vibration detector have a fixed positional relationship.

Additionally or alternatively, in this or other embodiments, the one or more speakers are in headphones.

Additionally or alternatively, in this or other embodiments, the vibration detector is part of an image sensor that includes a three-dimensional camera.

Additionally or alternatively, in this or other embodiments, the vibration detector is a three-dimensional laser Doppler vibrometer.

Additionally or alternatively, in this or other embodiments, the controller generates the audio as synthetic ambient sound that corresponds with the frequency of the vibration.

Additionally or alternatively, in this or other embodiments, the controller generates the audio based on a mapping between the frequency of the vibration and the audio or based on machine learning.

In another embodiment, a method includes attaching a vibration detector to an atmospheric suit for a space environment. The vibration detector detects a location of vibration and identifies a frequency of the vibration. The method also includes disposing a controller coupled to the vibration detector to generate audio corresponding to the frequency of vibration detected by the vibration detector, and disposing one or more speakers in the atmospheric suit to receive the audio from the controller and to provide the audio as directional sound to a wearer of the atmospheric suit.

Additionally or alternatively, in this or other embodiments, the disposing the one or more speakers is within a helmet of the atmospheric suit.

Additionally or alternatively, in this or other embodiments, the disposing the one or more speakers is as an array of four or more speakers arranged around a volume within the helmet.

Additionally or alternatively, in this or other embodiments, disposing the array of four or more speakers includes establishing a fixed positional relationship with the vibration detector.

Additionally or alternatively, in this or other embodiments, the disposing the one or more speakers is in headphones.

Additionally or alternatively, in this or other embodiments, the method also includes attaching an image sensor that includes the vibration detector and a three-dimensional camera.

Additionally or alternatively, in this or other embodiments, the attaching the vibration detector is as a three-dimensional laser Doppler vibrometer.

Additionally or alternatively, in this or other embodiments, the method also includes configuring the controller to generate the audio as synthetic ambient sound that corresponds with the frequency of the vibration.

Additionally or alternatively, in this or other embodiments, the method also includes configuring the controller to generate the audio based on a mapping between the frequency of the vibration and the audio or based on machine learning.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, astronauts in space and lunar environments cannot hear ambient sounds. On the lunar surface, exemplary sources of ambient sound include loose soil on which the astronaut is walking or rolling rocks. Ambient sounds can provide situational awareness and can also provide warnings. For example, the ambient sound representing the rolling of a large rock toward the astronaut can serve as a warning to move out of the way.

Embodiments of the systems and methods detailed herein relate to vibration-based directional synthetic ambient sound production in space. Ambient sound is generated synthetically based on vibrations detected in the environment. The ambient sound is presented to the astronaut as directional sound to facilitate situational awareness as though the astronaut were in an environment in which ambient sounds could be heard. That is, the ambient sound that is generated is what would be heard if there were a medium to transmit the sound. One or more sensors are used to detect vibrations in the environment. These vibrations are used to generate synthetic ambient sound that is audible to the astronaut and is presented as directional audio, as further detailed.

Figure 1:
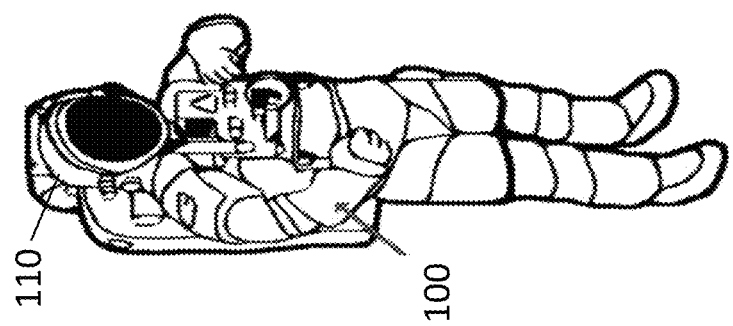
FIG. 1 shows aspects of an atmospheric suit with a helmet that provides vibration-based directional ambient sound production according to one or more embodiments.

FIG. 1 shows aspects of an atmospheric suit 100 with a helmet 110 that provides vibration-based directional ambient sound production according to one or more embodiments. The atmospheric suit 100 may be an extravehicular mobility unit (EMU) used in a space application, as one example. The helmet 110 provides a volume 115 (FIG. 2) to accommodate the head of a wearer of the atmospheric suit 100. The helmet 110 includes an inner bubble that maintains the gasses of the atmospheric suit 100 to create an environment to sustain the wearer. As detailed in FIG. 2, the helmet 110 may include one or more speakers 210 that output audio that simulates ambient sound that cannot actually be heard in the space environment. The one or more speakers 210 provide the audio with directionality.

Figure 2:
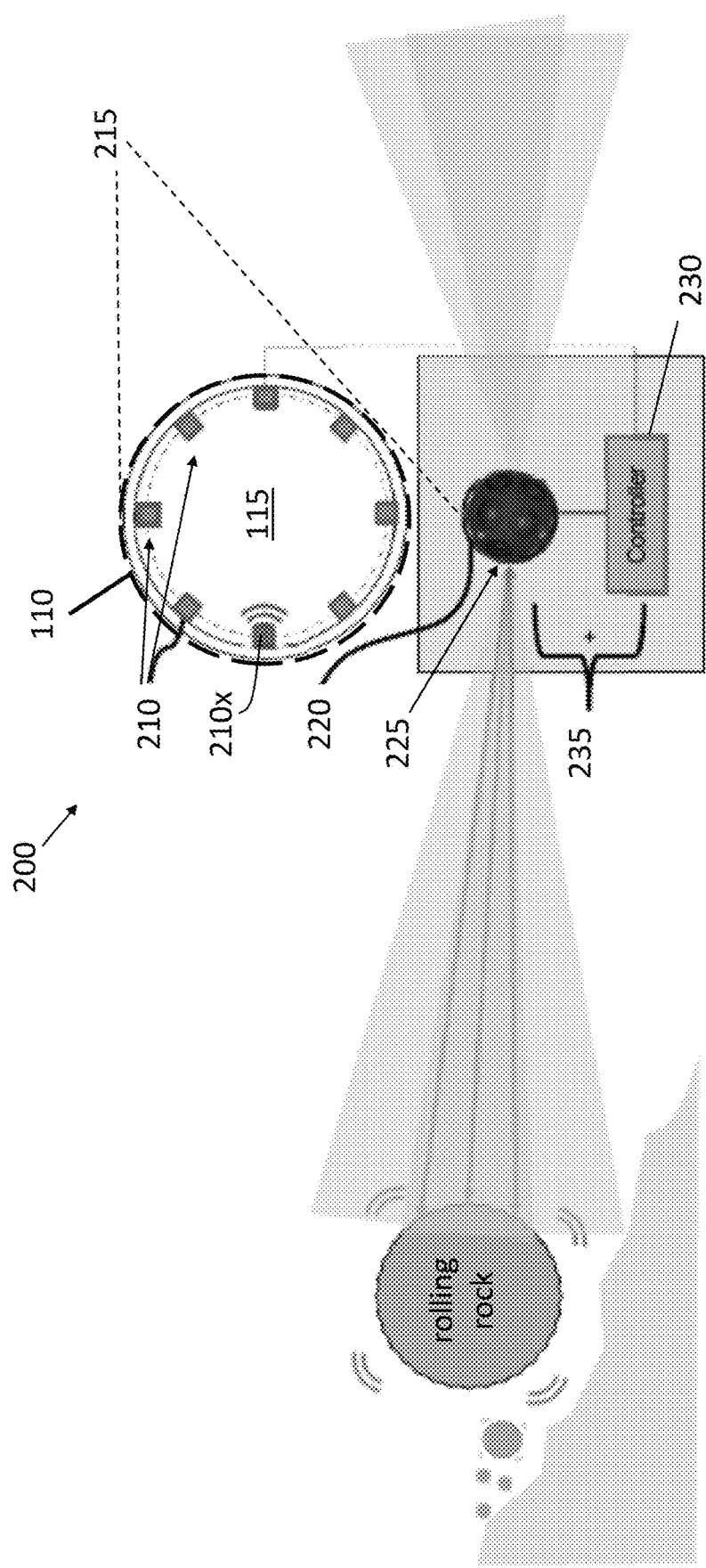
FIG. 2 is a system for vibration-based directional synthetic ambient sound production in space according to one or more embodiments.

FIG. 2 is a system 200 for vibration-based directional synthetic ambient sound production in space according to one or more embodiments. A cross-sectional view of the helmet 110 is shown such that an array of speakers 210 is exposed. According to an exemplary alternate embodiment, directional earphones may be worn by the astronaut in the atmospheric suit 100. A sensor 220 includes a vibrometer (e.g., three-dimensional laser Doppler vibrometer) that detects vibration. The system 200 may also include a camera that facilitates identification and tracking of objects (e.g., rolling rock) using known image processing techniques. The sensor 220 may include a three-dimensional camera that supports six degrees of freedom (6Dof).

The vibrometer and camera, together, are referred to as an image sensor 225. Because the system 200 produces directional sound, the field of view of the sensor 220, which may be comprised of an array of image sensors 225, is 360 degrees and over a range of elevations. That is, adjacent image sensors 225 may have overlapping fields of view such that the sensor 220 with an array of the image sensors 225 is coupled to the atmospheric suit 100 and detects vibration at an identifiable relative location in the environment around the atmospheric suit 100. Based on the location of the sensor 220, more than one sensor 220 may be used to sense vibrations all around the astronaut (e.g., vibration of the lunar surface below the astronaut's feet, vibration caused by a rock rolling down toward the astronaut). One or more sensors 220 (e.g., one or more arrays of image sensors 225) provide vibration frequency and location information to a controller 230.

The controller 230 determines an audio signal that represents the ambient sound corresponding with the frequency of vibration (i.e., synthetic ambient sound). The controller 230 may use a mapping of a range of frequencies of vibration to a frequency (i.e., pitch) of an audio signal, for example. According to an alternate embodiment, the controller 230 may learn an earth-based correspondence between vibration and audio output in a machine learning process to determine the synthetic ambient sound that corresponds with detected vibrations. That is, because the vibration is carried by an air medium to produce sound waves on earth, the correspondence between vibration and sound may be used in a supervised learning process. The sensor 220 and controller 230, together, represent a directional audio generation system 235.

According to other alternate embodiments, the same sound may be produced for any vibration or a synthetic non-ambient sound may be generated based on a frequency of the vibration. Movement of the vibration may be a factor in determining the non-ambient sound (e.g., alarm tone). For example, if the location of the vibration is moving toward the sensor 220 of the atmospheric suit 100 (e.g., as in the rolling rock scenario illustrated in FIG. 2), the synthetic sound may reflect that the situation requires immediate attention from the wearer of the atmospheric suit 100.

As previously noted, directionality of the vibration that gives rise to the production of ambient sound provides additional situational awareness for the wearer of the atmospheric suit 100. A reference point 215 is indicated on the helmet 110 and the sensor 220. The relationship between the helmet 110 and the sensor 220 and, thus, between their respective reference points 215, is fixed. As a result, the location of the vibration relative to the sensor 220, which is among the information provided to the controller 230, corresponds with the location of ambient sound within the helmet 110. As previously noted, an array of speakers 210 may be used to produce the directional sound or directional headphones may be worn by the astronaut, for example.

According to the exemplary orientation shown in FIG. 2, a rolling rock to the left of the helmet 110 is the source of vibration detected by the sensor 220. As a result, the controller 230 generates ambient sound and plays it through the speaker 210x, which is on the left side of the helmet 110, as shown. Thus, the wearer of the atmospheric suit 100 is readily alerted not only to the presence of the activity but also to its relative position.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    a vibration detector configured to detect a location of vibration and identify a frequency of the vibration;
    a controller configured to generate audio corresponding to the frequency of vibration detected by the vibration detector; and
    an array of three or more speakers configured to provide the audio as directional sound, wherein the array of three or more speakers in disposed within a helmet of an atmospheric suit.

2. The system according to claim 1, wherein the array of three or more speakers includes four or more speakers arranged around a volume within the helmet.

3. The system according to claim 2, wherein the array of three or more speaker and the vibration detector have a fixed positional relationship.

4. The system according to claim 1, wherein the vibration detector is part of an image sensor that includes a three-dimensional camera.

5. The system according to claim 1, wherein the vibration detector is a three-dimensional laser Doppler vibrometer.

6. The system according to claim 1, wherein the controller is configured to generate the audio as synthetic ambient sound that corresponds with the frequency of the vibration.

7. The system according to claim 1, wherein the controller is configured to generate the audio based on a mapping between the frequency of the vibration and the audio or based on machine learning.

8. A method comprising:
attaching a vibration detector to an atmospheric suit that is configured for a space environment, the vibration detector being configured to detect a location of vibration and identify a frequency of the vibration;
disposing a controller coupled to the vibration detector, the controller being configured to generate audio corresponding to the frequency of vibration detected by the vibration detector; and
disposing an array of three or more speakers in a helmet of the atmospheric suit to receive the audio from the controller and to provide the audio as directional sound to a wearer of the atmospheric suit.

9. The method according to claim 8, wherein the array of three or more speakers is arranged around a volume within the helmet.

10. The method according to claim 9, wherein disposing the array of three or more speakers array of four or more speakers includes establishing a fixed positional relationship with the vibration detector.

11. The method according to claim 8, further comprising attaching an image sensor that includes the vibration detector and a three-dimensional camera.

12. The method according to claim 8, wherein the attaching the vibration detector is as a three-dimensional laser Doppler vibrometer.

13. The method according to claim 8, further comprising configuring the controller to generate the audio as synthetic ambient sound that corresponds with the frequency of the vibration.

14. The method according to claim 8, further comprising configuring the controller to generate the audio based on a mapping between the frequency of the vibration and the audio or based on machine learning.

* * * * *